United States Patent
Nogueira-Nine et al.

(10) Patent No.: US 11,388,023 B2
(45) Date of Patent: Jul. 12, 2022

(54) FLEXIBLE LOW-POWER WIDE-AREA NETWORK (LPWAN) APPARATUS AND ARCHITECTURE

(71) Applicant: FLEX LTD., Singapore (SG)

(72) Inventors: Juan Benigno Nogueira-Nine, Stuttgart (DE); Johan Botvidzon, Mantorp (SE); Linus Isberg Martinsson, Linköping (SE)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/379,297

(22) Filed: Apr. 9, 2019

(65) Prior Publication Data

US 2019/0312752 A1   Oct. 10, 2019

Related U.S. Application Data

(60) Provisional application No. 62/655,027, filed on Apr. 9, 2018.

(51) Int. Cl.
| | |
|---|---|
| *H04L 12/66* | (2006.01) |
| *H04B 1/401* | (2015.01) |
| *H04W 88/16* | (2009.01) |
| *H04W 88/10* | (2009.01) |

(52) U.S. Cl.
CPC ............ *H04L 12/66* (2013.01); *H04B 1/401* (2013.01); *H04W 88/10* (2013.01); *H04W 88/16* (2013.01)

(58) Field of Classification Search
CPC .. H04Q 9/00; H04Q 2209/25; H04Q 2209/43; H04Q 2209/47; H04Q 2209/60;
(Continued)

(56) References Cited

U.S. PATENT DOCUMENTS

| | | | | |
|---|---|---|---|---|
| 9,407,624 | B1* | 8/2016 | Myers | .................... H04W 12/04 |
| 2008/0111737 | A1* | 5/2008 | Haverkamp | ............ G01S 19/25 |
| | | | | 342/357.64 |
| 2010/0226242 | A1* | 9/2010 | Bui | ...................... H04L 27/2602 |
| | | | | 370/210 |
| 2017/0082726 | A1* | 3/2017 | Gassion | .................... G01S 1/08 |

(Continued)

FOREIGN PATENT DOCUMENTS

WO    WO 2017/140681        8/2017

OTHER PUBLICATIONS https://ubidots.com/blog/explaining-sigfox/ Explaining Sigfox by Thomas Michaslki, pp. 1-11, Jul. 31, 2017.*

(Continued)

*Primary Examiner* — Golam Sorowar
(74) *Attorney, Agent, or Firm* — Sheridan Ross P.C.

(57) ABSTRACT

Embodiments of the disclosure provide systems and methods for a multi-protocol LPWAN gateway. In the first mode, a transceiver of the gateway device can communicate with wireless devices in a first LPWAN protocol and, in the second mode, the wireless transceiver can communicate with the one or more wireless devices in a second LPWAN protocol. The second LPWAN protocol can be different from the first LPWAN protocol. In response to selecting the first mode, the gateway device can cause the wireless transceiver to conduct communications with the wireless devices using the first LPWAN protocol. In response to selecting the second mode, the gateway device can cause the wireless transceiver to conduct communications with the wireless devices using the second LPWAN protocol.

17 Claims, 5 Drawing Sheets

(58) Field of Classification Search
CPC ......... H04Q 2209/84; H04Q 2209/883; H04Q 2209/886; H04Q 9/02; H04W 4/70; H04W 84/18; H04W 88/16; H04W 12/003; H04W 12/04; H04W 12/06; H04W 12/08; H04W 16/16; H04W 40/244; H04W 48/18; H04W 4/80; H04W 52/0277; H04W 52/028; H04W 56/0015; H04W 56/005; H04W 64/00; H04W 72/1278; H04W 84/045; H04W 84/12

See application file for complete search history.

(56) References Cited

U.S. PATENT DOCUMENTS

| | | | |
|---|---|---|---|
| 2017/0230074 A1* | 8/2017 | Rose | H02J 7/0014 |
| 2018/0063851 A1 | 3/2018 | Abraham et al. | |
| 2018/0092151 A1 | 3/2018 | Liu et al. | |
| 2018/0145819 A1* | 5/2018 | Axmon | H04L 5/16 |
| 2019/0238662 A1* | 8/2019 | Guibene | H04L 67/12 |

OTHER PUBLICATIONS

Extended European Search Report, for European Patent Application No. 19168113.9, dated Aug. 6, 2019 8 pages.

Official Action for European Patent Application No. 19168113.9, dated Jun. 3, 2020 7 pages.

Official Action for European Patent Application No. 19168113.9, dated Jan. 21, 2021 4 pages.

* cited by examiner

FLEXIBLE LOW-POWER WIDE-AREA NETWORK (LPWAN) APPARATUS AND ARCHITECTURE

CROSS REFERENCE TO RELATED APPLICATION

The present application claims the benefits of and priority, under 35 U.S.C. § 119(e), to U.S. Provisional Application No. 62/655,027 filed on Apr. 9, 2018, entitled "Flexible LPWAN Apparatus and Architecture," of which the entire disclosure is incorporated herein by reference for all that it teaches and all purposes.

FIELD OF THE DISCLOSURE

Embodiments of the present disclosure relate generally to methods and systems for computer communications networks and more particularly to a multi-protocol Low-Power Wide-Area Network (LPWAN) gateway.

BACKGROUND

A Low-Power Wide-Area Network (LPWAN) is a type of wireless telecommunication wide-area network designed to allow long range communications at a low bit rates among various connected devices, such as sensors operated on a battery. Such implementations are commonly referred to as the Internet of Things (IoT). The term IoT refers to the concept of extending Internet connectivity beyond conventional computing platforms such as personal computers and mobile devices, and into any range of previously non-internet-enabled physical devices. Embedded with electronics, Internet connectivity, and other forms of hardware such as sensors, for example, these devices can communicate and interact with others over the Internet, and they can be remotely monitored and controlled. Such devices can access the Internet through an LPWAN access point or gateway.

However, as these devices and networks have developed, so have different protocols with no one standard emerging. Current LPWAN access points or gateways are dedicated devices operating on a single protocol and within a certain frequency band for the supported devices. Thus, development of an IoT environment can be limited to a particular protocol and devices supporting that protocol. This can present challenges in developing an IoT environment and deploying new devices. Hence, there is a need for improved methods and systems for a multi-protocol LPWAN gateway.

BRIEF SUMMARY

Embodiments of the disclosure provide systems and methods for a multi-protocol Low-Power Wide-Area Network (LPWAN) gateway such as may be used, for example, in various Internet of Things (IoT) networks. According to one embodiment, an LPWAN gateway device can comprise a wireless transceiver using a first LPWAN protocol, a processor coupled with the wireless transceiver, and a memory coupled with and readable by the processor. The memory can have stored therein a set of instructions which, when executed by the processor, causes the processor to control the wireless transceiver by selecting a first mode or a second mode for communicating with one or more wireless devices through the wireless transceiver. In response to selecting the first mode, the processor can cause the wireless transceiver to conduct communications with the one or more wireless devices using the first LPWAN protocol. In response to selecting the second mode, the processor can cause the wireless transceiver to conduct communications with the one or more wireless devices using a second LPWAN protocol. The second LPWAN protocol can be different from the first LPWAN protocol.

For example, the first LPWAN protocol can comprise a Long-Range Wide-Area Network (LoRaWAN) protocol and the second LPWAN protocol can comprise a SigFox protocol. In such cases, causing the wireless transceiver to conduct communications with the one or more wireless devices using the first LPWAN protocol can comprise executing, by the processor, a LoRaWAN protocol stack. Causing the wireless transceiver to conduct communications with the one or more wireless devices using the second LPWAN protocol can comprise executing, by the processor, one or more library routines. The one or more library routines can cause the processor to configure one or more registers of the wireless transceiver and drive one or more control signals to the wireless transceiver to cause the wireless transceiver to emulate a Frequency Shift Keying (FSK) ultra-narrow band transceiver operating on the SigFox protocol.

In some implementations, the LPWAN gateway can further comprise a temperature compensating oscillator coupled with the wireless transceiver. The temperature compensating oscillator can be tuned to a center frequency of a frequency band and the wireless transceiver can use a clock output of the temperature compensating oscillator to maintain operation within the frequency band. Additionally, or alternatively, the LPWAN gateway device can comprise one or more of a Wireless Fidelity (WiFi) transceiver coupled with the processor, a Bluetooth Low Energy (BLE) transceiver coupled with the processor and/or a Global Navigation Satellite System (GNSS) receiver coupled with the processor.

According to another embodiment, an LPWAN can comprise one or more wireless devices and an LPWAN gateway device communicatively coupled with the one or more wireless devices. The LPWAN gateway device can comprise a wireless transceiver using a first LPWAN protocol, a processor coupled with the wireless transceiver, and a memory coupled with and readable by the processor. The memory can have stored therein a set of instructions which, when executed by the processor, causes the processor to control the wireless transceiver by selecting a first mode or a second mode for communicating with one or more wireless devices through the wireless transceiver. In response to selecting the first mode, the processor can cause the wireless transceiver to conduct communications with the one or more wireless devices using the first LPWAN protocol. In response to selecting the second mode, the processor can cause the wireless transceiver to conduct communications with the one or more wireless devices using a second LPWAN protocol. The second LPWAN protocol can be different from the first LPWAN protocol.

For example, the first LPWAN protocol can comprise a LoRaWAN protocol and the second LPWAN protocol can comprise a SigFox protocol. In such cases, causing the wireless transceiver to conduct communications with the one or more wireless devices using the first LPWAN protocol can comprise executing, by the processor, a LoRaWAN protocol stack. Causing the wireless transceiver to conduct communications with the one or more wireless devices using the second LPWAN protocol can comprise executing, by the processor, one or more library routines. The one or more library routines can cause the processor to configure one or more registers of the wireless transceiver and drive one or more control signals to the wireless transceiver to cause the wireless transceiver to emulate a FSK ultra-narrow band transceiver operating on the SigFox protocol.

In some implementations, the LPWAN gateway can further comprise a temperature compensating oscillator coupled with the wireless transceiver. The temperature compensating oscillator can be tuned to a center frequency of a frequency band and the wireless transceiver can use a clock output of the temperature compensating oscillator to maintain operation within the frequency band. Additionally, or alternatively, the LPWAN gateway device can comprise one or more of a WiFi transceiver coupled with the processor, a BLE transceiver coupled with the processor and/or a GNSS receiver coupled with the processor.

According to yet another embodiment, a method for operating an LPWAN can comprise selecting, by a processor of an LPWAN gateway device, a first mode or a second mode for communicating with one or more wireless devices through a wireless transceiver of the LPWAN gateway device. In the first mode, the wireless transceiver can communicate with the one or more wireless devices in a first LPWAN protocol and, in the second mode, the wireless transceiver can communicate with the one or more wireless devices in a second LPWAN protocol, wherein the second LPWAN protocol is different from the first LPWAN protocol. In response to selecting the first mode, the processor of the LPWAN gateway device can cause the wireless transceiver to conduct communications with the one or more wireless devices using the first LPWAN protocol. In response to selecting the second mode, the processor of the LPWAN gateway device can cause the wireless transceiver to conduct communications with the one or more wireless devices using the second LPWAN protocol.

For example, the first LPWAN protocol can comprise a LoRaWAN protocol and the second LPWAN protocol can comprise a SigFox protocol. In such cases, causing the wireless transceiver to conduct communications with the one or more wireless devices using the first LPWAN protocol can comprise executing, by the processor, a LoRaWAN protocol stack. Causing the wireless transceiver to conduct communications with the one or more wireless devices using the second LPWAN protocol can comprise executing, by the processor, one or more library routines. The one or more library routines can cause the processor to configure one or more registers of the wireless transceiver and drive one or more control signals to the wireless transceiver to cause the wireless transceiver to emulate a FSK ultra-narrow band transceiver operating on the SigFox protocol.

Figure 1:
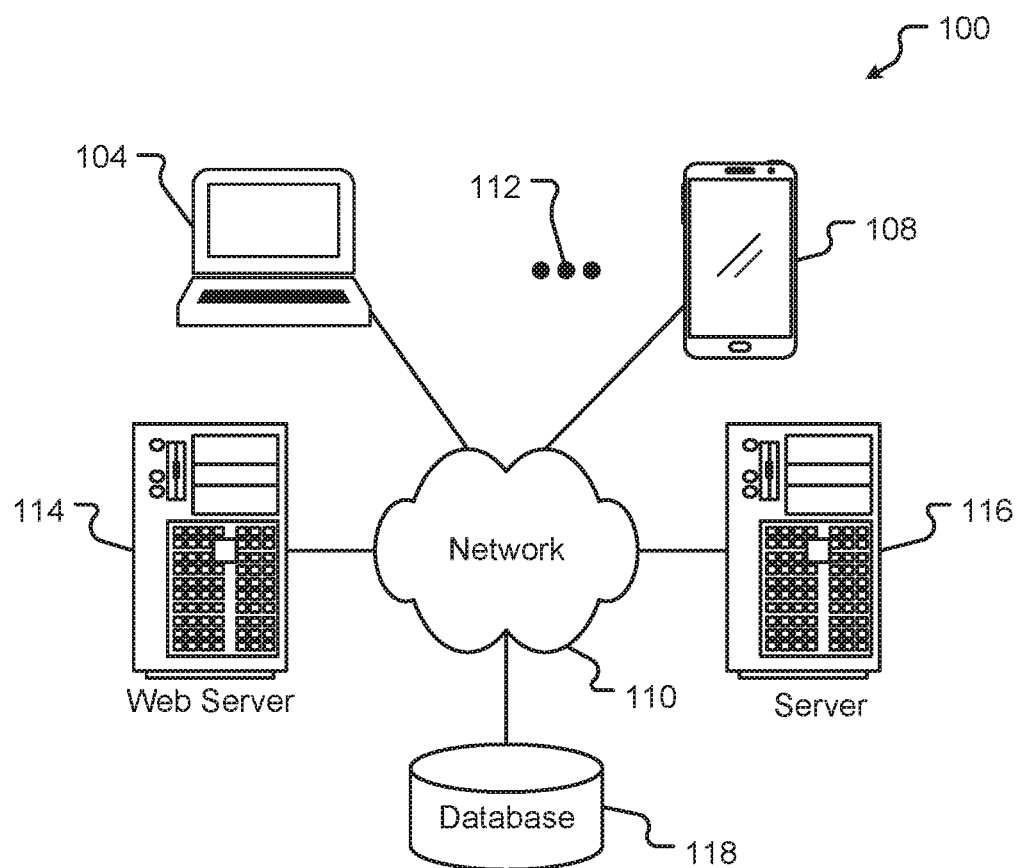
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
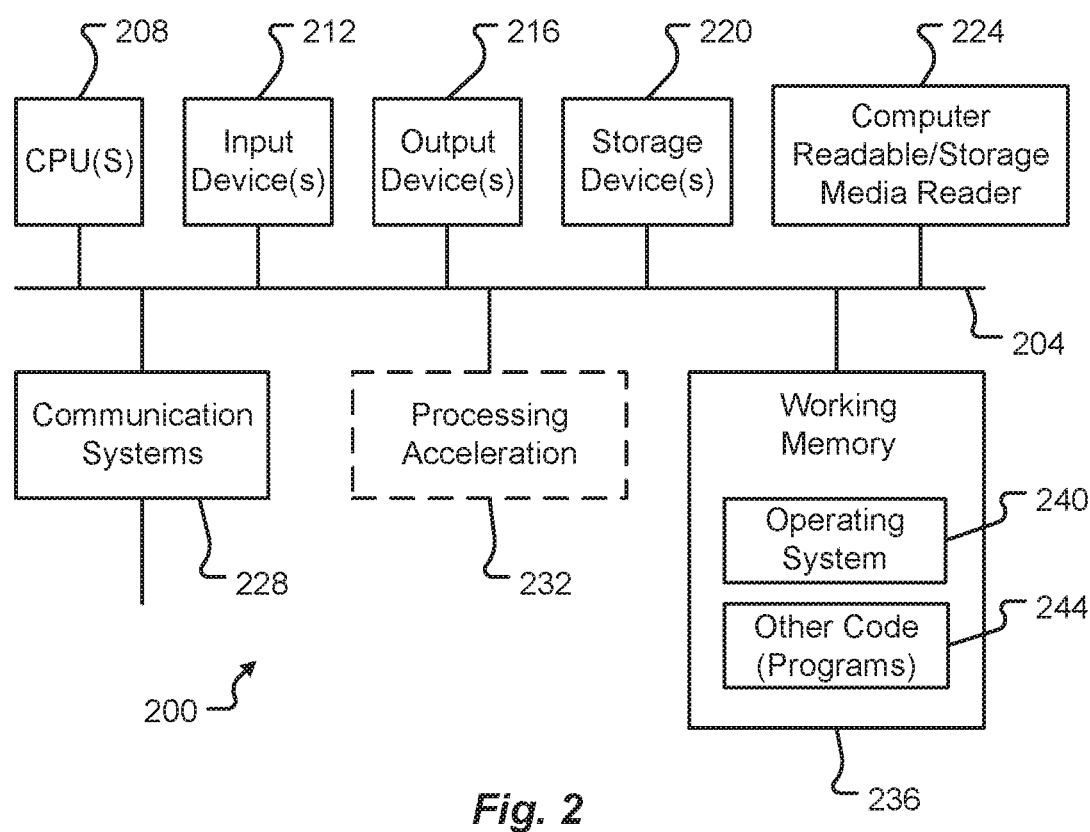
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
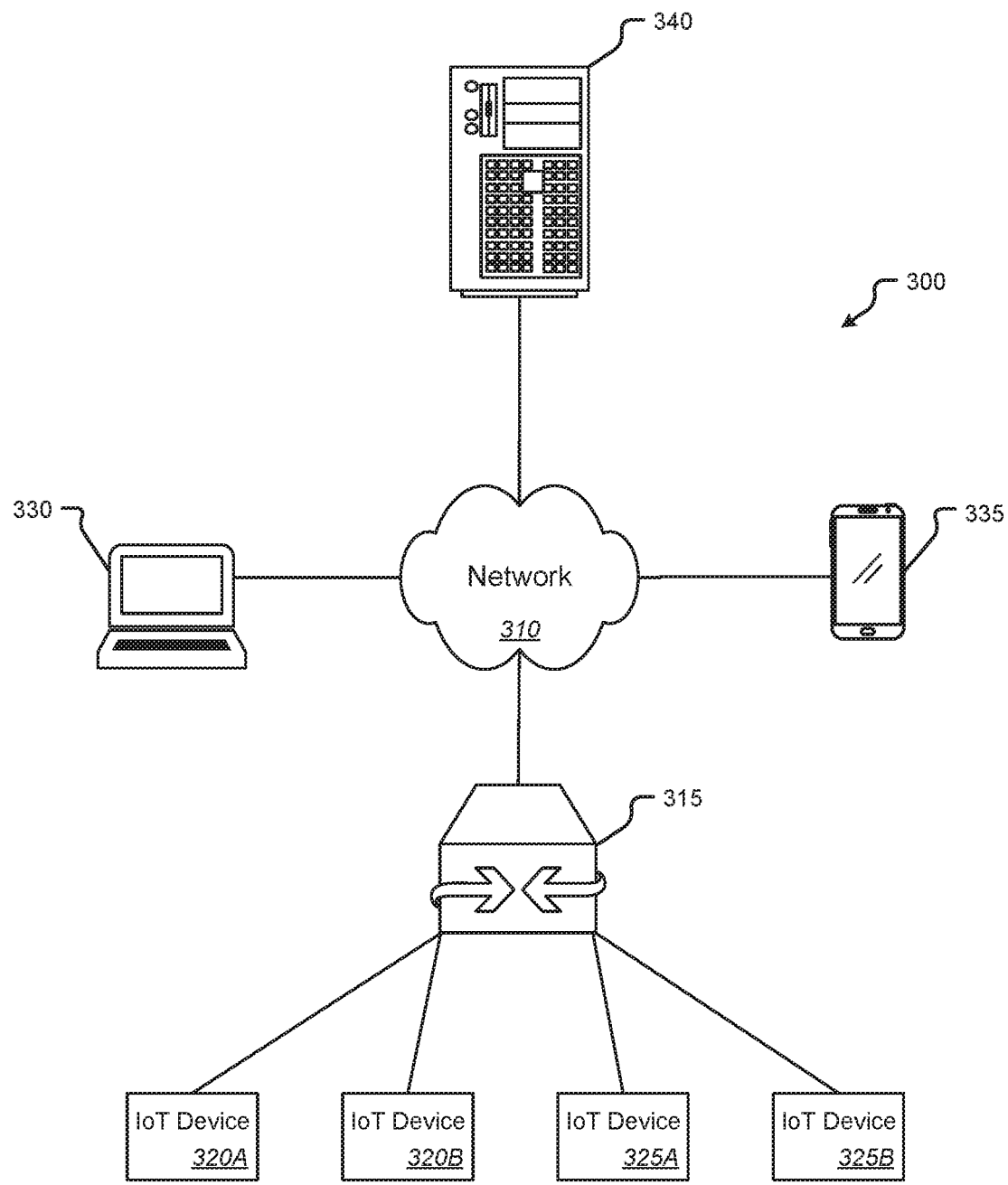
FIG. 3 is a block diagram illustrating an exemaplry Internet of Things (IoT) environment in which embodiments of the present disclosure may be implemented.

FIG. 3 is a block diagram illustrating an exemplary Internet of Things (IoT) environment in which embodiments of the present disclosure may be implemented. As introduced above, embodiments of the disclosure provide systems and methods for a multi-protocol Low-Power Wide-Area Network (LPWAN) gateway such as may be used, for example, in various IoT networks. This example illustrates an IoT environment 300 including one or more networks 310 including, but not limited to, the Internet, one or more cellular and/or other wireless communications networks, and/or any number of other wired and/or wireless networks as known in the art.

An LPWAN gateway device 315 can be communicatively coupled with the network 310. Any number and variety of IoT device 320A, 320B, 325A and/or 325B can wirelessly connect to and communicate with the LPWAN gateway device 315. Through the LPWAN gateway device 315, the IoT devices 320A, 320B, 325A and/or 325B can access, or be access by, any number and variety of computer systems 330, mobile devices 335, servers 340, e.g., providing a variety of online services, etc.

LPWAN devices do not utilize a single technology standard. Instead, a group of various low-power, wide area network technologies that use different frequency bands and protocols have developed. LPWANs can use licensed or unlicensed frequencies and include proprietary or open standard options. For example, Sigfox is a proprietary, unlicensed LPWAN protocol running over a public network in the 868 MHz or 902 MHz bands using the ultra-narrow-band technology. In another example, Long-Range Wide-Area Network (LoRaWAN) is the media access control (MAC) layer protocol derived from chirp spread spectrum (CSS) modulation which transmits in several sub-gigahertz frequencies.

In some cases, an IoT environment 300 may be developed in which both SigFox IoT devices 320A and 320B are present with LoRaWAN IoT devices 325A and 325B. Rather than limiting the environment 300 to one particular protocol and devices supporting that protocol, embodiments of the present disclosure are directed to a multi-protocol gateway device 315 that supports more than one protocol. As will be described in greater detail below, an LPWAN gateway device 315 can be can be set to different modes for communicating with IoT devices 320A and 320B or 325A and 325B using different protocols. When one mode is selected, the LPWAN gateway device 315 can conduct communications with the IoT devices 320A and 320B using a first LPWAN protocol, e.g., LoRaWAN which may operate in a first frequency band. When the LPWAN gateway device 315 is in a second mode, the gateway device 315 can conduct communications with the wireless devices 325A and 325B using a second LPWAN protocol e.g., SigFox. In some cases, the communications conducted in the second protocol may be conducted in the same, first frequency band. In other cases, the communications conducted in the second protocol may be conducted using a second frequency band. In such cases, the second frequency band may be within, but narrower than, the first frequency band or may be, in some implementations, completely different from the first frequency band.

Figure 4:
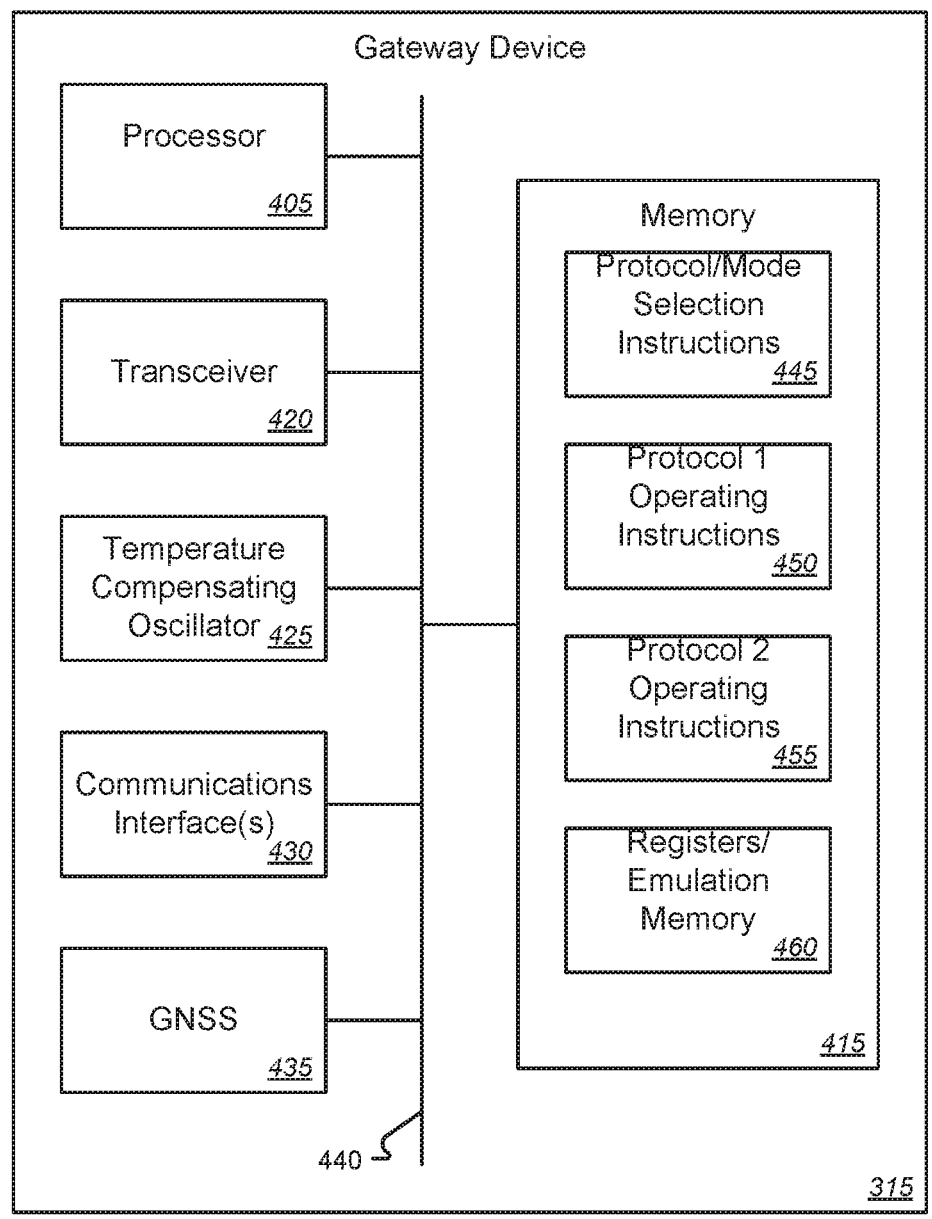
FIG. 4 is a block diagram illustrating elements of an exemplary multi-protocol LPWAN gateway according to one embodiment of the present disclosure.

FIG. 4 is a block diagram illustrating elements of an exemplary multi-protocol LPWAN gateway according to one embodiment of the present disclosure. As illustrated in this example, a gateway device 315 can comprise a processor 405. The processor 405 may correspond to one or many computer processing devices. For instance, the processor 405 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 405 may be provided as a microprocessor, Central Processing Unit (CPU), or plurality of microprocessors that are configured to execute the instructions sets stored in a memory 415. Upon executing the instruction sets stored in memory 415, the processor 405 enables various functions of the gateway device 315 as described herein.

The memory 415 can be coupled with and readable by the processor 405 via a communications bus 440. The memory 415 may include any type of computer memory device or collection of computer memory devices. Non-limiting examples of memory 415 include Random Access Memory (RAM), Read Only Memory (ROM), flash memory, Electronically-Erasable Programmable ROM (EEPROM), Dynamic RAM (DRAM), etc. The memory 415 may be configured to store the instruction sets depicted in addition to temporarily storing data for the processor 405 to execute various types of routines or functions.

The processor 205 can also be coupled with a wireless transceiver 420 via the communications bus 440. Generally speaking, and as will be described in greater detail below, the transceiver 420 can comprise a wireless LPWAN transceiver which, under the control of the processor 405, can operate in a plurality of different modes. For example, in a first mode, the transceiver 420 can operate using a first LPWAN protocol and, in a second mode, the transceiver 420 can operate using a second LPWAN protocol.

More specifically, the memory 415 can have stored therein a set of protocol or mode selection instructions 445 which, when executed by the processor 405, causes the processor 405 to control the wireless transceiver 420 by selecting a first mode or a second mode for communicating with one or more wireless devices through the wireless transceiver 420. Selecting the first mode or the second mode by the protocol or mode selection instructions 445 can be performed in a variety of different ways. For example, the device may be preconfigured by a manufacturer or supplier to operate in one of the two modes. In another example, the mode may be selected through a setup or configuration procedure performed at installation or when a change to the network is made. In yet another example, the mode can be determined by the device scanning for and detecting devices within range and operable in or of the modes and then selecting a mode based on the types of devices discovered. Other variations are contemplated and considered to be within the scope of the present disclosure.

In response to the protocol or mode selection instructions 445 causing the processor 405 to select the first mode, a set of first protocol operating instructions 450 can cause the processor 405 to control the wireless transceiver 420 to conduct communications with the one or more wireless devices using the first LPWAN protocol. In response to the protocol or mode selection instructions 445 causing the processor 405 to select the second mode, a set of second protocol operating instructions 455 can cause the processor 405 to control the wireless transceiver 420 to conduct communications with the one or more wireless devices using a second LPWAN protocol. The second LPWAN protocol can be different from the first LPWAN protocol.

For example, the first LPWAN protocol can comprise a Long-Range Wide-Area Network (LoRaWAN) protocol and the second LPWAN protocol can comprise a SigFox protocol. In such cases, the first protocol operating instructions 450 can include a LoRaWAN protocol stack which can cause the processor 405 to control the wireless transceiver 420 accordingly and conduct communications with the one or more wireless devices using the LoRanWAN. The second protocol operating instructions 455 can include one or more library routines which can cause the processor 405 to control the wireless transceiver 420 causing the wireless transceiver to conduct communications with the one or more wireless devices using SigFox protocol. The one or more library routines of the second protocol operating instructions 455 can cause the processor 405 to configure one or more registers or emulation memory 460 used by the wireless transceiver 460 and drive one or more control signals to the wireless transceiver 420 to cause the wireless transceiver 420 to emulate a Frequency Shift Keying (FSK) ultra-narrow band transceiver operating on the SigFox protocol.

In some implementations, the LPWAN gateway device 315 can further comprise a temperature compensating oscillator 425 coupled with the wireless transceiver 420. The temperature compensating oscillator 425 can be tuned to a center frequency of a frequency band for the wireless transceiver, e.g., either the first or second frequency bands mentioned above, if different, and the wireless transceiver 420 can use a clock output of the temperature compensating oscillator 425 to maintain operation within the frequency band. Additionally, or alternatively, the LPWAN gateway device 315 can comprise one or more other communication interfaces 430 including, but not limited to a Wireless Fidelity (WiFi) transceiver a Bluetooth Low Energy (BLE) transceiver, etc. The one or more communications interfaces 430 can be coupled with the processor 405 via the bus 440 and can be used to provide communications between the gateway device 315 and one or more other devices within range. For example, the communication interfaces 430 can be used to provide access to the gateway device to perform setup or configuration operations in conjunction with another device such as a nearby laptop computer, tablet, etc.

In some cases, the LPWAN gateway device 315 can additionally or alternatively comprise a Global Navigation Satellite System (GNSS) receiver 435 coupled with the processor 405 via the bus 440. Since the operating frequency bands for various protocols and/or devices can vary by geographic region, the GNSS receiver 435 can be used, for example, to determine a location of the gateway device 315. This location information can then be used by the protocol operating instructions 450 and 455 and/or transceiver 420 to set and control the frequency bands in which the two modes of the gateway device 315 operate.

Figure 5:
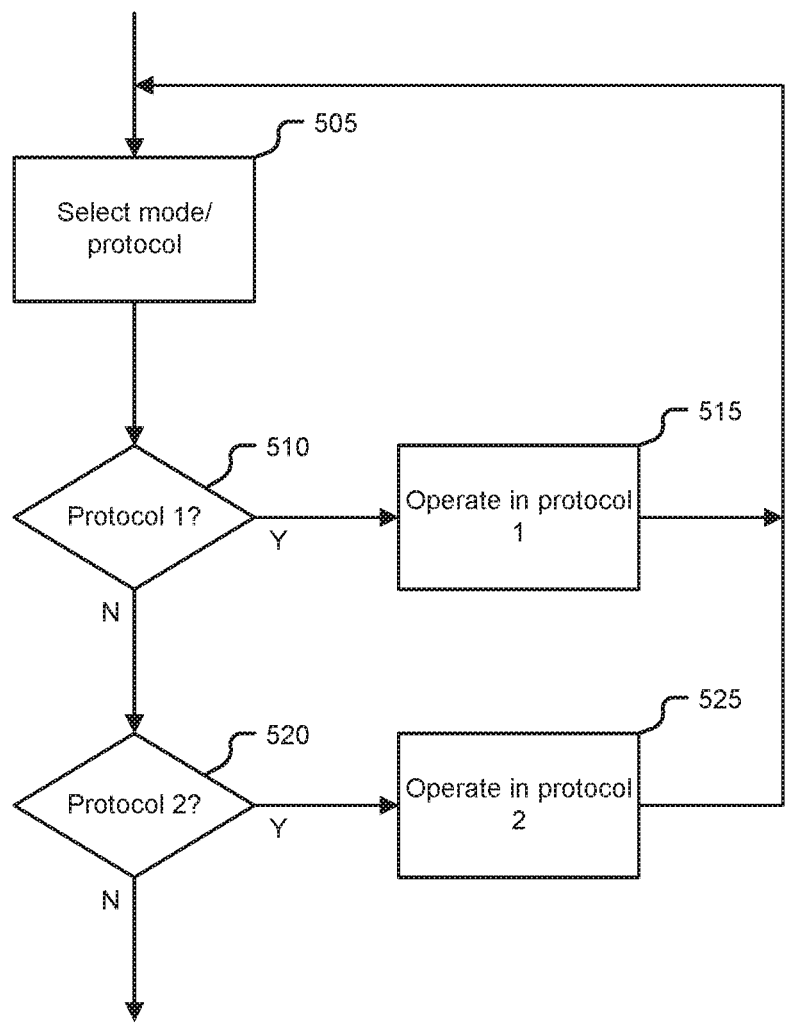
FIG. 5 is a flowchart illustrating an exemplary process for operating a multi-protocol LPWAN gateway according to one embodiment of the present disclosure.

FIG. 5 is a flowchart illustrating an exemplary process for operating a multi-protocol LPWAN gateway according to one embodiment of the present disclosure. As illustrated in this example, operating an LPWAN can comprise selecting 505, by a processor of an LPWAN gateway device, a first mode or a second mode for communicating with one or more wireless devices through a wireless transceiver of the LPWAN gateway device. Selecting 505 the first mode or the second mode can be performed in a variety of different ways. For example, the device may be preconfigured by a manufacturer or supplier to operate in one of the two modes. In another example, the mode may be selected through a setup or configuration procedure performed at installation or when a change to the network is made. In yet another example, the mode can be determined by the device scanning for and detecting devices within range and operable in or of the modes and then selecting a mode based on the types of devices discovered. Other variations are contemplated and considered to be within the scope of the present disclosure.

In the first mode, the wireless transceiver can communicate with the one or more wireless devices in a first LPWAN protocol and, in the second mode, the wireless transceiver can communicate with the one or more wireless devices in a second LPWAN protocol, wherein the second LPWAN protocol is different from the first LPWAN protocol. For example, the first LPWAN protocol can comprise a LoRaWAN protocol and the second LPWAN protocol can comprise a SigFox protocol.

Therefore, once the mode is selected 505, a set of one or more determinations 510 and 520 can be made as to which mode to operate in. In response to determining 510 the first mode has been selected, the processor of the LPWAN gateway device can cause the wireless transceiver to operate 515 or conduct communications with the one or more wireless devices using the first LPWAN protocol. In the example noted above in which the first LPWAN protocol is LoRaWAN and the second LPWAN protocol is SigFox, causing the wireless transceiver to operate 515 and conduct communications with the one or more wireless devices using the first LPWAN protocol can comprise executing, by the processor, a LoRaWAN protocol stack.

In response to determining 520 the second mode has been selected, the processor of the LPWAN gateway device can cause the wireless transceiver to operate 525 and conduct communications with the one or more wireless devices using the second LPWAN protocol. In the example above in which the first LPWAN protocol is LoRaWAN and the second LPWAN protocol is SigFox, causing the wireless transceiver to operate 525 and conduct communications with the one or more wireless devices using the second LPWAN protocol can comprise executing, by the processor, one or more library routines. The one or more library routines can cause the processor to configure one or more registers of the wireless transceiver and drive one or more control signals to the wireless transceiver to cause the wireless transceiver to emulate an FSK ultra-narrow band transceiver operating on the SigFox protocol. In other words, the library routines executed by the processor of the gateway device can cause the transceiver to emulate a SigFox transceiver using the SigFox protocol rather than a LoRaWAN transceiver using the LoRaWAN protocol.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A Low-Power Wide-Area Network (LPWAN) gateway device comprising:
  a wireless transceiver selectively using a first LPWAN protocol in a first frequency band and a second LPWAN protocol in a second frequency band, wherein the second frequency band is different from the first frequency band;
  a Global Navigation Satellite System (GNSS) receiver;
  a temperature compensating oscillator coupled with the wireless transceiver and tuned to a center frequency of a selected one of the first frequency band and the second frequency band;

a processor coupled with the wireless transceiver, GNSS receiver, and temperature compensating oscillator; and a memory coupled with and readable by the processor and storing therein a set of instructions which, when executed by the processor, causes the processor to control the wireless transceiver by:

determining a geographic location of the LPWAN gateway based on input from the GNSS receiver;

selecting a first mode or a second mode for communicating with one or more wireless devices through the wireless transceiver;

setting the first frequency band or the second frequency band in which the selected first mode or second mode operates based on the determined geographic location of the LPWAN gateway;

in response to selecting the first mode, causing the wireless transceiver to conduct communications with the one or more wireless devices using the first LPWAN protocol in the first frequency band and wherein the wireless transceiver uses a clock output of the temperature compensating oscillator to maintain operation within the first frequency band; and in response to selecting the second mode, causing the wireless transceiver to conduct communications with the one or more wireless devices using a second LPWAN protocol in the second frequency band, wherein the second LPWAN protocol is different from the first LPWAN protocol and wherein the wireless transceiver uses the clock output of the temperature compensating oscillator to maintain operation within the second frequency band.

2. The LPWAN gateway device of claim 1, wherein the first LPWAN protocol comprises a Long-Range Wide-Area Network (LoRaWAN) protocol.

3. The LPWAN gateway device of claim 2, wherein causing the wireless transceiver to conduct communications with the one or more wireless devices using the first LPWAN protocol comprises executing, by the processor, a LoRaWAN protocol stack.

4. The LPWAN gateway device of claim 3, wherein the second LPWAN protocol comprises a SigFox protocol.

5. The LPWAN gateway device of claim 4, wherein causing the wireless transceiver to conduct communications with the one or more wireless devices using the second LPWAN protocol comprises executing, by the processor, one or more library routines, wherein the one or more library routines cause the processor to configure one or more registers of the wireless transceiver and drive one or more control signals to the wireless transceiver to cause the wireless transceiver to emulate a Frequency Shift Keying (FSK) ultra-narrow band transceiver operating on the SigFox protocol.

6. The LPWAN gateway device of claim 1, further comprising a Wireless Fidelity (WiFi) transceiver coupled with the processor.

7. The LPWAN gateway device of claim 1, further comprising a Bluetooth Low Energy (BLE) transceiver coupled with the processor.

8. The LPWAN gateway device of claim 1, further comprising a Global Navigation Satellite System (GNSS) receiver coupled with the processor.

9. A Low-Power Wide-Area Network (LPWAN) comprising:

one or more wireless devices;

an LPWAN gateway device communicatively coupled with the one or more wireless devices, the LPWAN gateway device comprising:

a wireless transceiver selectively using a first LPWAN protocol in a first frequency band and a second LPWAN protocol in a second frequency band, wherein the second frequency band is different from the first frequency band;

a Global Navigation Satellite System (GNSS) receiver;

a temperature compensating oscillator coupled with the wireless transceiver and tuned to a center frequency of a selected one of the first frequency band and the second frequency band;

a processor coupled with the wireless transceiver, GNSS receiver, and temperature compensating oscillator; and a memory coupled with and readable by the processor and storing therein a set of instructions which, when executed by the processor, causes the processor to control the wireless transceiver by:

determining a geographic location of the LPWAN gateway based on input from the GNSS receiver;

selecting a first mode or a second mode for communicating with one or more wireless devices through the wireless transceiver;

setting the first frequency band or the second frequency band in which the selected first mode or second mode operates based on the determined geographic location of the LPWAN gateway;

in response to selecting the first mode, causing the wireless transceiver to conduct communications with the one or more wireless devices using the first LPWAN protocol in the first frequency band and wherein the wireless transceiver uses a clock output of the temperature compensating oscillator to maintain operation within the first frequency band; and in response to selecting the second mode, causing the wireless transceiver to conduct communications with the one or more wireless devices using a second LPWAN protocol in the second frequency band, wherein the second LPWAN protocol is different from the first LPWAN protocol and wherein the wireless transceiver uses the clock output of the temperature compensating oscillator to maintain operation within the second frequency band.

10. The LPWAN of claim 9, wherein the first LPWAN protocol comprises a Long-Range Wide-Area Network (LoRaWAN) protocol.

11. The LPWAN of claim 10, wherein causing the wireless transceiver to conduct communications with the one or more wireless devices using the first LPWAN protocol comprises executing, by the processor, a LoRaWAN protocol stack.

12. The LPWAN of claim 11, wherein the second LPWAN protocol comprises a SigFox protocol.

13. The LPWAN of claim 12, wherein causing the wireless transceiver to conduct communications with the one or more wireless devices using the second LPWAN protocol comprises executing, by the processor, one or more library routines, wherein the one or more library routines cause the processor to configure one or more registers of the wireless transceiver and drive one or more control signals to the wireless transceiver to cause the wireless transceiver to emulate a Frequency Shift Keying (FSK) ultra-narrow band transceiver operating on the SigFox protocol.

14. The LPWAN of claim 10, wherein the LPWAN gateway device further comprises a Wireless Fidelity (WiFi) transceiver coupled with the processor, a Bluetooth Low Energy (BLE) transceiver coupled with the processor, or a Global Navigation Satellite System (GNSS) receiver coupled with the processor.

15. A method for operating a Low-Power Wide-Area Network (LPWAN), the method comprising:
- determining, by a processor of an LPWAN gateway device, a geographic location of the LPWAN gateway based on input from a Global Navigation Satellite System (GNSS) receiver;
- selecting, by the processor of an LPWAN gateway device, a first mode or a second mode for communicating with one or more wireless devices through a wireless transceiver of the LPWAN gateway device wherein, in the first mode, the wireless transceiver communicates with the one or more wireless devices in a first LPWAN protocol using a first frequency band and, in the second mode, the wireless transceiver communicates with the one or more wireless devices in a second LPWAN protocol in a second frequency band, wherein the second LPWAN protocol is different from the first LPWAN protocol and the second frequency band is different from the first frequency band;
- setting, by the processor of an LPWAN gateway device, the first frequency band or the second frequency band in which the selected first mode or second mode operates based on the determined geographic location of the LPWAN gateway;
- in response to selecting the first mode, causing, by the processor of the LPWAN gateway device, the wireless transceiver to conduct communications with the one or more wireless devices using the first LPWAN protocol in the first frequency band wherein the wireless transceiver uses a clock output of a temperature compensating oscillator tuned to a center frequency of a selected one of the first frequency band and the second frequency band to maintain operation within the first frequency band; and
- in response to selecting the second mode, causing, by the processor of the LPWAN gateway device, the wireless transceiver to conduct communications with the one or more wireless devices using the second LPWAN protocol in the second frequency band wherein the wireless transceiver uses the clock output of the temperature compensating oscillator to maintain operation within the second frequency band.

16. The method of claim 15, wherein the first LPWAN protocol comprises a Long-Range Wide-Area Network (LoRaWAN) protocol and wherein causing the wireless transceiver to conduct communications with the one or more wireless devices using the first LPWAN protocol comprises executing, by the processor, a LoRaWAN protocol stack.

17. The method of claim 16, wherein the second LPWAN protocol comprises a SigFox protocol and wherein causing the wireless transceiver to conduct communications with the one or more wireless devices using the second LPWAN protocol comprises executing, by the processor, one or more library routines, wherein the one or more library routines cause the processor to configure one or more registers of the wireless transceiver and drive one or more control signals to the wireless transceiver to cause the wireless transceiver to emulate a Frequency Shift Keying (FSK) ultra-narrow band transceiver operating on the SigFox protocol.

* * * * *